US008769078B2

(12) United States Patent
Pesme et al.

(10) Patent No.: US 8,769,078 B2
(45) Date of Patent: Jul. 1, 2014

(54) METROLOGY DEVICE FOR THE AUTOMATIC MONITORING OF A DIGITAL SIGNAL BROADCAST NETWORK AND A BROADCAST NETWORK COMPRISING ONE SUCH METROLOGY DEVICE

(75) Inventors: Antoine Pesme, Montigny-les-Metz (FR); Daniel Mafille, Metz (FR); Jamal Baïna, Nancy (FR)

(73) Assignee: TDF, Paris (FR)

( * ) Notice: Subject to any disclaimer, the term of this patent is extended or adjusted under 35 U.S.C. 154(b) by 2290 days.

(21) Appl. No.: 10/498,466

(22) PCT Filed: Dec. 11, 2002

(86) PCT No.: PCT/FR02/04277
§ 371 (c)(1),
(2), (4) Date: Oct. 7, 2004

(87) PCT Pub. No.: WO03/051004
PCT Pub. Date: Jun. 19, 2003

(65) Prior Publication Data
US 2005/0037711 A1 Feb. 17, 2005

(30) Foreign Application Priority Data
Dec. 13, 2001 (FR) ...................................... 01 16073

(51) Int. Cl.
*G06F 15/173* (2006.01)
(52) U.S. Cl.
USPC ............ 709/224; 709/223; 709/225; 709/226
(58) Field of Classification Search
USPC ................................................ 709/223–226
See application file for complete search history.

(56) References Cited

U.S. PATENT DOCUMENTS

| | | | | | |
|---|---|---|---|---|---|
| 3,819,872 | A | * | 6/1974 | Hamrick | 455/438 |
| 3,824,597 | A | * | 7/1974 | Berg | 370/215 |
| 3,944,723 | A | * | 3/1976 | Fong | 178/3 |
| 4,516,216 | A | * | 5/1985 | Armstrong | 709/224 |
| 4,918,623 | A | * | 4/1990 | Lockitt et al. | 709/224 |
| 5,016,159 | A | * | 5/1991 | Maruyama | 370/390 |
| 5,187,806 | A | * | 2/1993 | Johnson et al. | 455/15 |
| 5,579,321 | A | * | 11/1996 | Van Grinsven et al. | 370/442 |
| 5,594,949 | A | * | 1/1997 | Andersson et al. | 455/437 |
| 5,596,364 | A | * | 1/1997 | Wolf et al. | 348/192 |
| 5,606,727 | A | * | 2/1997 | Ueda | 455/513 |
| 5,644,623 | A | * | 7/1997 | Gulledge | 455/423 |
| 5,663,957 | A | * | 9/1997 | Dent | 370/347 |
| 5,678,175 | A | * | 10/1997 | Stuart et al. | 455/13.1 |
| 5,708,963 | A | * | 1/1998 | Mobley et al. | 455/12.1 |
| 5,802,173 | A | * | 9/1998 | Hamilton-Piercy et al. | 379/56.2 |
| 5,841,766 | A | * | 11/1998 | Dent et al. | 370/321 |

(Continued)

*Primary Examiner* — Rupal Dharia
*Assistant Examiner* — Marcus McKenzie
(74) *Attorney, Agent, or Firm* — Allen, Dyer, Doppelt, Milbrath & Gilchrist, P.A.

(57) ABSTRACT

The metrological device, for example for a broadcasting network, for monitoring an upline broadcast signal includes a main component and upline control data. The metrological device includes an extraction circuit for extracting the upline control data from the upline broadcast signal and delivering an upline instruction, and a measuring circuit for measuring a parameter of the upline broadcast signal according to the upline instruction and delivering a measurement result. A control circuit produces a downline instruction from the measurement results and an upline result produced by the extraction circuit from the upline control data, and an insertion circuit produces a downline signal to broadcast comprising firstly the main component of the upline broadcast signal and secondly the downline control data containing the downline instruction.

11 Claims, 1 Drawing Sheet

(56) References Cited

U.S. PATENT DOCUMENTS

| | | | |
|---|---|---|---|
| 5,862,451 A * | 1/1999 | Grau et al. | 725/116 |
| 5,943,324 A * | 8/1999 | Ramesh et al. | 370/321 |
| 5,959,984 A * | 9/1999 | Dent | 370/347 |
| 5,961,604 A * | 10/1999 | Anderson et al. | 709/229 |
| 5,977,913 A * | 11/1999 | Christ | 342/465 |
| 6,038,251 A * | 3/2000 | Chen | 375/222 |
| 6,094,680 A * | 7/2000 | Hokanson | 709/223 |
| 6,141,688 A * | 10/2000 | Bi et al. | 709/227 |
| 6,219,544 B1 * | 4/2001 | Suutarinen | 455/423 |
| 6,275,990 B1 * | 8/2001 | Dapper et al. | 725/106 |
| 6,337,754 B1 * | 1/2002 | Imajo | 398/115 |
| 6,347,220 B1 * | 2/2002 | Tanaka et al. | 455/277.2 |
| 6,349,128 B1 * | 2/2002 | Nelson | 378/44 |
| 6,411,623 B1 * | 6/2002 | DeGollado et al. | 370/395.1 |
| 6,418,558 B1 * | 7/2002 | Roberts et al. | 725/129 |
| 6,580,730 B1 * | 6/2003 | Loukianov | 370/522 |
| 6,643,295 B1 * | 11/2003 | Nose | 370/442 |
| 6,658,010 B1 * | 12/2003 | Enns et al. | 370/401 |
| 6,668,378 B2 * | 12/2003 | Leak et al. | 725/136 |
| 6,684,245 B1 * | 1/2004 | Shuey et al. | 709/223 |
| 6,749,122 B1 * | 6/2004 | Koenck et al. | 235/472.02 |
| 6,760,391 B1 * | 7/2004 | Alb et al. | 375/354 |
| 6,857,132 B1 * | 2/2005 | Rakib et al. | 725/114 |
| 6,954,795 B2 * | 10/2005 | Takao et al. | 709/231 |
| 7,130,908 B1 * | 10/2006 | Pecus et al. | 709/226 |
| 7,286,894 B1 * | 10/2007 | Grant et al. | 700/168 |
| 7,359,931 B2 * | 4/2008 | Tarabzouni et al. | 709/200 |
| 7,379,791 B2 * | 5/2008 | Tamarkin et al. | 700/286 |
| 7,457,306 B2 * | 11/2008 | Watanabe et al. | 370/442 |
| 7,761,496 B2 * | 7/2010 | Tarabzouni et al. | 709/200 |
| 7,801,221 B2 * | 9/2010 | Montard et al. | 375/240.2 |
| 8,035,508 B2 * | 10/2011 | Breed | 340/539.11 |
| 8,200,737 B2 * | 6/2012 | Tarabzouni et al. | 709/200 |
| 8,306,668 B2 * | 11/2012 | Tamarkin et al. | 700/286 |
| 2001/0032334 A1 * | 10/2001 | Dapper et al. | 725/105 |
| 2002/0012421 A1 * | 1/2002 | Geile et al. | 379/56.2 |
| 2002/0045451 A1 * | 4/2002 | Hwang et al. | 455/442 |
| 2002/0152303 A1 * | 10/2002 | Dispensa | 709/224 |
| 2002/0196766 A1 * | 12/2002 | Hwang et al. | 370/342 |
| 2003/0064683 A1 * | 4/2003 | Matthews et al. | 455/67.1 |
| 2003/0074441 A1 * | 4/2003 | Penk et al. | 709/224 |
| 2003/0076281 A1 * | 4/2003 | Morgan et al. | 345/44 |
| 2003/0126621 A1 * | 7/2003 | Leak et al. | 725/135 |
| 2004/0031030 A1 * | 2/2004 | Kidder et al. | 717/172 |
| 2004/0210414 A1 * | 10/2004 | Gregorius et al. | 702/119 |
| 2004/0252723 A1 * | 12/2004 | Tatsumoto et al. | 370/477 |
| 2005/0143974 A1 * | 6/2005 | Joly | 704/201 |
| 2006/0031180 A1 * | 2/2006 | Tamarkin et al. | 705/412 |
| 2006/0056375 A1 * | 3/2006 | Koyama et al. | 370/342 |
| 2006/0140266 A1 * | 6/2006 | Montard et al. | 375/240.2 |
| 2007/0217348 A1 * | 9/2007 | Tapia Moreno et al. | 370/278 |
| 2008/0040449 A1 * | 2/2008 | Grant et al. | 709/218 |
| 2008/0250869 A1 * | 10/2008 | Breed et al. | 73/861.27 |
| 2009/0054056 A1 * | 2/2009 | Gil | 455/423 |
| 2009/0109056 A1 * | 4/2009 | Tamarkin et al. | 340/870.02 |
| 2010/0250312 A1 * | 9/2010 | Tarabzouni et al. | 705/7 |
| 2010/0309805 A1 * | 12/2010 | Jones et al. | 370/252 |
| 2011/0170534 A1 * | 7/2011 | York | 370/350 |
| 2011/0217985 A1 * | 9/2011 | Gorokhov | 455/452.2 |
| 2013/0057413 A1 * | 3/2013 | Tamarkin et al. | 340/870.02 |
| 2013/0088995 A1 * | 4/2013 | Chun et al. | 370/252 |

* cited by examiner

METROLOGY DEVICE FOR THE AUTOMATIC MONITORING OF A DIGITAL SIGNAL BROADCAST NETWORK AND A BROADCAST NETWORK COMPRISING ONE SUCH METROLOGY DEVICE

FIELD OF THE INVENTION

The invention concerns a metrological device for automatically monitoring a broadcasting network. The invention can be used more specifically for monitoring the quality of broadcast signals, such as audio and/or video, digital or analog signals. The network can be a radio-broadcasting network, a cabled network, etc.

BACKGROUND OF THE INVENTION

A broadcasting network comprises in a known manner a series of relay stations that receive a signal broadcast by an upline station or front-end transmitting station and propagate it to downline stations and/or a receiver such as a television set. The area covered by the broadcast signal of course depends on the number of relay stations and their geographical distribution.

The broadcast signals are most often multiplexed signals comprising one or more audio and/or video and/or data components. The audio and/or video components can, for example, be relative to radio or television programs. The data are for example user data, intended for a user receiving the broadcast signal. The data can also be control data sent to network equipment receiving the broadcast signal, such as relay stations, television set-top boxes, etc. The audio, video and user-data components have no particular meaning for the equipment of the broadcasting network. The control data, however, control the operation, define a setting, etc., of the equipment to which they are sent.

The broadcasting network is generally supplemented by a remote management network to monitor and remotely control the equipment of the broadcasting network. To do this, the equipment items of the broadcasting network equipped with an appropriate communication interface are connected to a management device via an external communication network, such as a telephone network.

A monitoring network is most often provided as a complement, notably with the aim of monitoring the quality of the broadcast signal (detecting signal degradation), and restoring quality if necessary. In a known manner, such a monitoring network comprises a set of metrological devices installed at strategic points of the broadcasting network, for example near certain relay stations. All the metrological devices are connected to a supervising device via an external communication network (a telephone network for example). The monitoring network supervising device and the management device of the remote management network can be one and the same device, each fulfilling all the functions of the other.

FIG. 1 shows a simplified diagram of a monitoring network comprising a supervising device 110 and two measuring devices 120, 130 for monitoring a broadcast signal 100. A monitoring network such as that shown in FIG. 1 is mounted in a star arrangement. The supervising device controls all the metrological devices which, when polled, return information on the quality of the signal broadcast in the geographical zone they monitor. The broadcasting network supervising device federates all the metrological devices which, either at their own initiative or on request, can communicate information to it. More generally, the supervising device manages the monitoring network as a whole by ensuring the following two main functions: a metrological device control function (asking the metrological devices for information, adjusting a metrological device, etc.) and an information and alarm processing function (utilization of the received information, feeding back information to a person responsible for the broadcasting network, etc.).

As discussed above, monitoring a broadcasting network—as it is currently performed—requires the construction of a monitoring network in parallel with the broadcasting network to be monitored, which adds (in terms of either connections or load) to the remote management network associated with the broadcasting network. This increases the installation cost of the broadcasting network accordingly.

Seeking to reduce installation costs has led to the use of an external communication network (a telephone network for example). Although this reduces costs, it nevertheless leads to technical difficulties due essentially to the fact that communication routing times over an external network are poorly controlled. This approach does not, for example, permit reliable synchronization or coordination of the operation of several metrological devices. Lastly, the links between the metrological devices of the monitoring network forcibly pass via the central supervising device, and therefore via the external communication network.

SUMMARY OF THE INVENTION

An object of the invention is to provide a metrological device that can be integrated in the main broadcasting network.

Another object of the invention is to provide metrological devices that are capable of performing synchronized operations on a broadcast signal.

Another object of the invention is to achieve the control of a metrological device in another manner, without passing via the monitoring network supervising device. The use of the external communication network in this case is limited to actions for which routing-time precision is not vital, with the result that the workload of the supervising device is reduced.

With these objectives in view, the invention includes a metrological device for monitoring an upline broadcast signal comprising a principal component and upline control data. The metrological device includes an extraction circuit for extracting the upline control data from the upline broadcast signal and to provide an upline instruction, a measuring circuit to measure a parameter of the upline broadcast signal in accordance with the upline instruction and to provide a measurement result.

In accordance with the invention, the metrological device also comprises a control circuit to produce a downline instruction from the measurement result and an upline result produced by the extraction circuit from the upline control data. An insertion circuit produces a downline signal to broadcast, comprising firstly the main component of the upline broadcast signal, and secondly downline control data including the downline instruction. The control data can also include the upline result and/or the measurement result.

A metrological device in accordance with the invention can thus be controlled directly through the broadcast signal that it monitors, and it can additionally control a metrological device or an item of equipment in the broadcasting network through the downline instruction it inserts into the upline signal to broadcast. With the invention, all communications associated with the control of the metrological devices and/or the broadcasting network equipment pass via the broadcast signal. The network monitoring the quality of the signal broadcast by the broadcasting network can therefore be pared down, given that the supervising device of the monitoring network and the external communication lines no longer play a role in the control function of the metrological devices.

Problems associated with the use of an external communication network for the control functions are thus reduced and/or eliminated: data transmission time, synchronization of several metrological devices, costs, etc. This also makes it possible to envisage finer analysis of the broadcast signal, such as taking synchronism measurements of the broadcast signal for several metrological devices. Subjective quality rating or error rate measurements can thus be envisaged with the invention.

With the invention, the purpose of the monitoring network is to process the information received from the metrological and alarm devices when necessary. Depending on the method of producing the metrological device, the downline instruction can be: an instruction to control operation of a relay station or an end-receiver in the broadcasting network, receiving the downline signal to broadcast; or a command to take a measurement on the downline signal to broadcast; or a complete or partial update of the internal functions of the downline metrological devices.

The invention also concerns a broadcasting network comprising at least one metrological device such as is described above. The broadcasting network can also include a metrological device of level N1 and a metrological device of level N2 strictly higher than N1. In this case the upline instruction produced by the extraction circuit of the level N2 device corresponds to the downline instruction produced by the control circuit of the level N1 metrological device.

Discussion of the level of a metrological device means the position of the device with respect to a front-end station of the network. Thus the device of level N2 higher than N1 receives the broadcast signal after the level N1 device has received—and possibly modified and transmitted—it. The level N2 device is said to be downline of the level N1 device. In accordance with the invention, the level N1 device can control the operation of the level N2 device. The N1 device can also more simply provide the level N2 device with a measurement result to be used or simply transmitted.

The broadcasting network also comprises a front-end station to transmit the broadcast signal, and the upline instruction extracted by the extraction circuit of the level N1 metrological device is, for example, an instruction inserted into the signal broadcast by the front-end station, or by a metrological device of level N0 associated with the front-end station. The broadcasting network also comprises an end-receiver to receive and use the broadcast signal, and the downline instruction produced by the control circuit of the level N2 metrological device is, for example, intended to control the operation of the end-receiver. The end-receiver is, for example, a monitoring end-receiver.

BRIEF DESCRIPTION OF THE DRAWINGS

The invention will be more clearly understood and other particular features and advantages will appear through reading the following description of a metrological device and a broadcasting network in accordance with the invention. The description is to be read in relation to the appended drawing figures, in which.

DETAILED DESCRIPTION OF THE PREFERRED EMBODIMENTS

Figure 1:
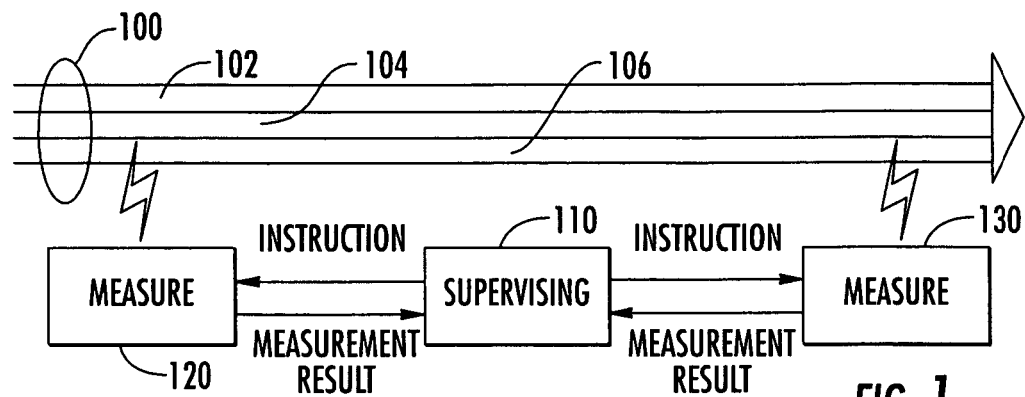
FIG. 1, described above, is a schematic diagram of a known monitoring network of a broadcasting network.
Figure 2:
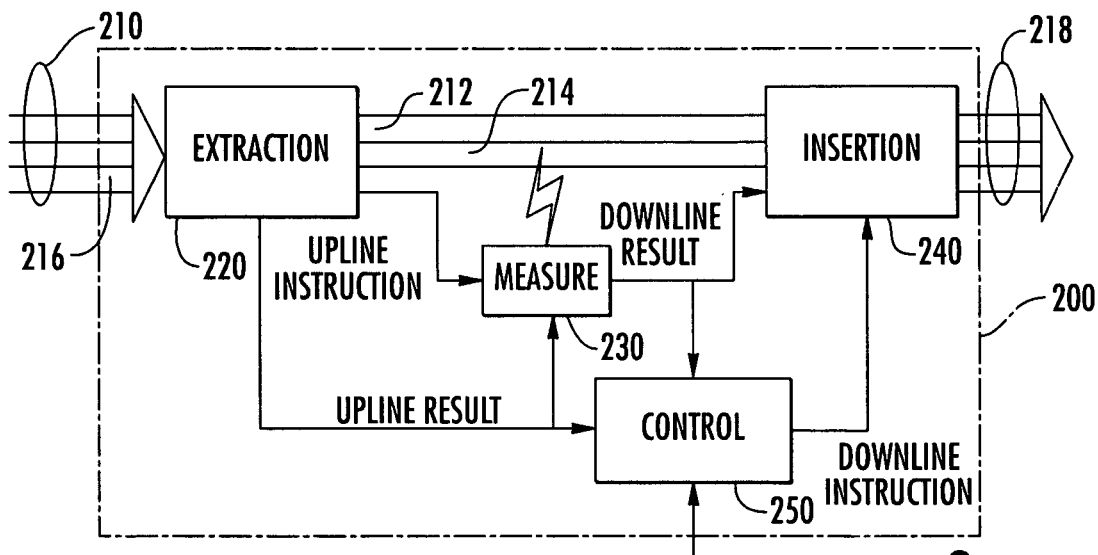
FIG. 2 is a schematic diagram of a metrological device in accordance with the invention.

A metrological device 200 in accordance with the invention is shown in FIG. 2. The device 200 is used to monitor an upline broadcast signal 210. In the example given, the upline signal 210 is a multiplexed signal comprising more specifically an audio component 212 and a video component 214 relative to a television channel, and control data 216. The audio component 212 and the video component 214 form the main broadcast signal.

Device 200 comprises a data extraction circuit 220, a measuring circuit 230, a data insertion circuit 240 and a control circuit 250. The extraction circuit 220 receives the upline broadcast signal 210, extracts the control data it contains, and delivers an upline instruction. The measuring circuit 230, according to the upline instruction, takes one or more measurements of one or more parameters of the upline broadcast signal 210, in particular on the audio 212 and/or video 214 components of the upline broadcast signal 210.

Device 230 then provides a downline result relative to the analyzed parameter(s) of the upline broadcast signal 210, in accordance with the upline instruction. The extracted control data can be control instructions for the measuring circuit 230; device 230 in this case can be a simple means of measuring one or more parameters of the audio and/or video components (quality, power measurers, etc.). The measurement result is then the direct result of the measurements taken. To give an example, an instruction is of the type "measure the quality of the video component image", the measurement result in this case is a quality rating that is then broadcast to the stations and/or downline metrological devices, after being inserted in the upline broadcast signal.

The extracted control data can be synchronization control instructions (for example "identify image Y in the video component"), thereby enabling a precise extract of the broadcast signal to be analyzed. It is then possible to synchronize the action of the measuring circuits of several metrological devices, for example to take a given measurement on the main broadcast signal or a given extract of the broadcast signal (same image or group of images in the video component, or the same extract of the audio signal but at different moments in time, but offset in time owing to the spatial propagation time of the broadcast signal).

The control data extracted by device 220 can also be upline measurement results associated with control instructions for the measuring circuit 230. To give an example, the upline result is: "the reference signal equals Y0, the error rate at instant TN−1 equals RN=YN−1/Y0"; the upline instruction is: "calculate the error rate RN=YN/Y0 at instant TN, then calculate the degradation of the error rate RN−RN−1.

Device 230 in this case can be a means of measuring the quality of the video component, associated with a comparator. The downline result provided by the measuring circuit in this case is the result of the comparison. The upline instruction and/or the upline result are contained in the upline broadcast signal. They have been introduced into the broadcast signal: either through the network front-end station; or through another metrological device N1 situated between the front-end station and device N2 that receives it.

The control circuit 250 receives the upline measurement result and the downline result (if any) delivered by the device 230, and in return it produces a downline instruction. In the same way as the upline instruction, the upline result is extracted from the upline broadcast signal by the extraction circuit 220. The upline result has, for example, been introduced into the broadcast signal by an upline metrological device in accordance with the invention, which polls the broadcast signal and is situated upline of the metrological device receiving the upline results.

The downline instruction may include instructions for controlling a measuring circuit and/or a relay station and/or an end-receiver (example: future change of frequency of the broadcast signal, reinitializing of a measuring circuit). The downline instruction can also include measuring results obtained by the measuring circuit 230 associated with the control circuit 240, or alternatively by a measuring circuit situated upline of it. All these results will be able to be used subsequently by another measuring circuit receiving the downline signal (to make a comparison for example), or else be stored by a monitoring end-receiver for later use.

The insertion circuit 240 receives the downline result and the downline instruction and produces a downline signal 218 to be broadcast, which comprises an audio component and a video component identical to the corresponding components of the upline signal 210, and including the control data. The control data include more specifically the downline instruction and/or the downline result. It will be noted that the control data contained in the downline signal can be partially or totally different from those of the upline signal.

A metrological device in accordance with the invention is thus capable of extracting control data from the upline signal and processing them to produce a downline signal containing the control data updated by the control circuit and the measuring circuit.

Thus, the control circuit of a metrological device 200 of level N1 can control an end-receiver and/or a downline metrological device of level N2>N1 according to the measurement results acquired at level N1, or even upline of the level N1 device. In this case, by level of a metrological device we mean the position of a device with respect to the transmitting station. For example, a device of level N2>N1 receives the broadcast signal after the level N1 device has received and transmitted it. As a general rule, a metrological device in accordance with the invention has the following characteristics: it can perform measurements on the broadcast signal, and the corresponding measurement control instructions are carried by the main signal itself; it can transmit control instructions and/or the measurement results to downline metrological devices and/or any other downline equipment item in the broadcasting network.

A broadcasting network in accordance with the invention includes, in the same way as a known network, a front-end station to transmit the signal to broadcast, at least one end-receiver to receive and use the broadcast signal, and possibly one or more relay stations to receive the broadcast signal and transmit in an identical form. A broadcasting network in accordance with the invention also includes a set of metrological devices in accordance with the invention, distributed over the broadcasting area covered by the broadcast signal.

Figure 3:
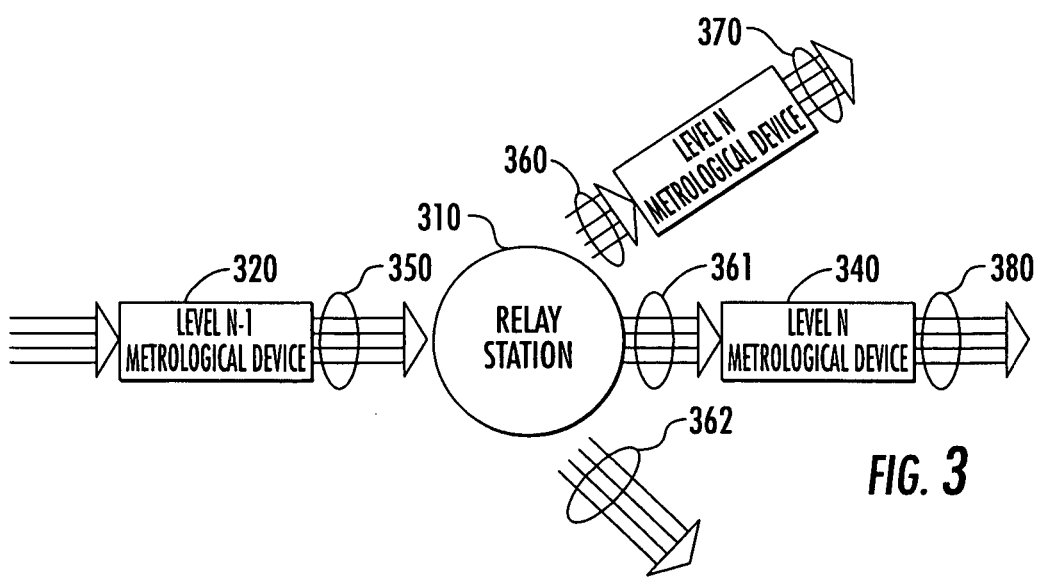
FIG. 3 is a simplified partial diagram of a broadcasting network in accordance with the invention.

FIG. 3 provides a simplified diagram of a section of a broadcasting network in accordance with the invention, which comprises more specifically a relay station 310 and three metrological devices 320, 330, and 340 configured as shown in the diagram of FIG. 2. In FIG. 3 the metrological devices are situated in the vicinity of the relay station, but to make the figure clearer they are not shown to scale. In practice, devices 320, 330 and 340 can be situated anywhere between a few centimeters and tens of thousands of kilometers from a relay station.

The relay station 310 receives the downline broadcast signal 350 of level N−1 and retransmits three identical upstream broadcast signals 360, 361 and 362 of level N in three main directions. Of course, in practice and in a known manner, the relay station can retransmit the broadcast signal in more than three main directions, in a half-plane, etc.

The metrological device 320 of level N−1 receives an upline broadcast signal of level N−1, propagated by a network equipment item that is not illustrated, and returns the downline signal 350 of level N−1, in which it may have modified the control data. The metrological device 330 of level N receives the upline broadcast signal 360 of level N and returns the downline signal 370 of level N, in which it may have modified the control data. In the same way, the metrological device 340 of level N receives the upline broadcast signal 361 of level N and returns the downline signal 380 of level N, in which it may have modified the control data. It should be noted that signals 370, 380 can include different control data because these data are modified—possibly in different manners—by different metrological devices.

Devices 320, 330, 340 are produced in accordance with the diagram in FIG. 2, and function in a similar manner. Firstly they receive a downline broadcast signal and extract (via extraction circuit 220) control data, upline instructions and/or upline results. They then carry out the measuring operations (measuring circuit 230) on the audio and/or video components of the broadcast signal, in accordance with the extracted upline instructions. If necessary, they determine downline instructions for controlling downline metrological devices. Lastly, they insert new control data (measurement results and/or downline instructions) in the broadcast signal, thereby forming a downline broadcast signal.

All the metrological devices are controlled according to the control data included in the upline broadcast signal they receive. These control data can, depending on the case, include instructions inserted initially in the main signal broadcast by a front-end station of the network, instructions inserted by one or more metrological devices of a lower level (i.e. situated between the front-end station and the metrological device concerned) in the broadcast signal during its propagation. Moreover, the measurement results (all results or only the relevant results, as the case may be) are transmitted to an end-receiver and/or to one or more downline metrological device(s) via the broadcast signal.

That which is claimed is:

1. A metrological device for monitoring an upline broadcast signal comprising a main component and upline control data, the metrological device comprising:
    an extraction circuit for extracting the upline control data from the upline broadcast signal and generating an upline instruction and an upline result;
    a measuring circuit, to receive the upline instruction from the extraction circuit, and for measuring a parameter of the upline broadcast signal in accordance with the received upline instruction and delivering a measurement result;
    a control circuit for producing a downline instruction from the measurement result and the upline result; and
    an insertion circuit for producing a downline signal to broadcast including the main component of the upline broadcast signal and downline control data including the downline instruction, the downline instruction being a command to take a measurement on the downline signal.

2. A metrological device in accordance with claim 1, wherein the downline control data also includes at least one of the upline result and the measurement result.

3. A metrological device in accordance with claim 1, wherein the downline instruction is an instruction controlling operation of one of a relay station and an end-receiver of a broadcasting network receiving the downline signal to broadcast.

4. A broadcasting network comprising:
- a front-end station transmitting an upline broadcast signal including a main component and upline control data;
- at least one relay station for relaying the upline broadcast signal; and
- at least one metrological device for monitoring the upline broadcast signal and each comprising
  - an extraction circuit for extracting the upline control data from the upline broadcast signal and generating an upline instruction and an upline result,
  - a measuring circuit, to receive the upline instruction from the extraction circuit, and for measuring a parameter of the upline broadcast signal in accordance with the received upline instruction and delivering a measurement result,
  - a control circuit for producing a downline instruction from the measurement result and the upline result, and to control operation of the at least one relay station, and
  - an insertion circuit for producing a downline signal to broadcast including the main component of the upline broadcast signal and downline control data including the downline instruction, the downline instruction being a command to take a measurement on the downline signal.

5. A broadcasting network in accordance with claim 4, wherein the at least one metrological device comprises at least a first level metrological device and a second level metrological device, the second level being higher than the first level; and wherein the upline instruction produced by the extraction circuit of the second level metrological device corresponds to the downline instruction produced by the control circuit of the first level metrological device.

6. A broadcasting network in accordance with claim 5, wherein the upline instruction extracted by the extraction circuit of the first level metrological device is an instruction inserted in the upline broadcast signal transmitted by the front-end station.

7. A broadcasting network in accordance with claim 5, wherein the downline instruction produced by the control circuit of the second level metrological device controls operation of higher level metrological devices.

8. A broadcasting network in accordance with claim 7, wherein the downline instruction produced by the control circuit of the second level metrological device also controls operation of a downline station.

9. A method of monitoring an upline broadcast signal comprising a main component and upline control data, the method comprising:
- extracting the upline control data from the upline broadcast signal and generating an upline instruction and an upline result;
- receiving the upline instruction at a measuring circuit, and measuring a parameter of the upline broadcast signal in accordance with the received upline instruction and generating a measurement result;
- producing a downline instruction from the measurement result and the upline result; and
- producing a downline signal to broadcast including the main component of the upline broadcast signal and downline control data including the downline instruction
- wherein the downline instruction is a command to take a measurement on the downline signal.

10. A method in accordance with claim 9, wherein the downline control data also includes at least one of the upline result and the measurement result.

11. A method in accordance with claim 9, wherein the downline instruction is an instruction controlling operation of one of a relay station and an end-receiver of a broadcasting network receiving the downline signal to broadcast.

* * * * *